Figure 1:
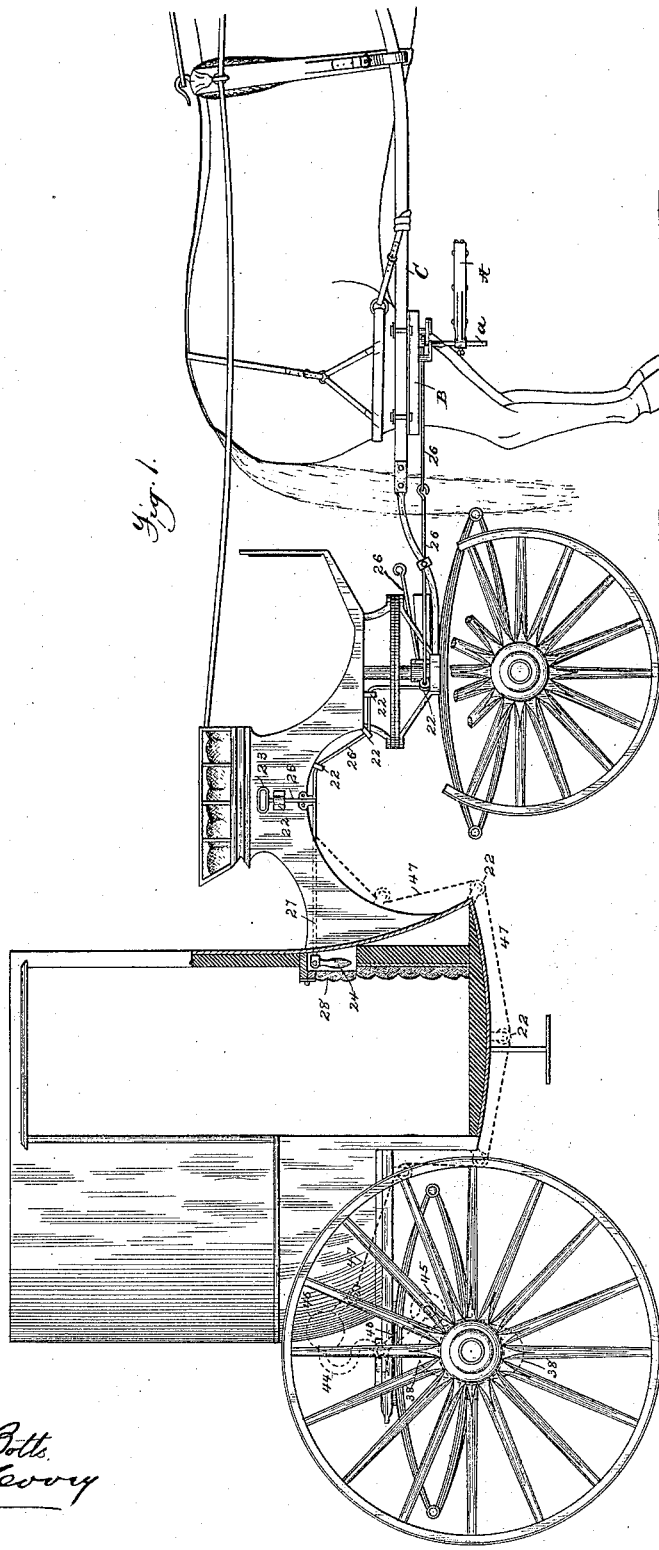

(No Model.) 11 Sheets—Sheet 1.
W. W. ROSENFIELD.
APPARATUS FOR CONTROLLING HORSES.

No. 344,009. Patented June 22, 1886.

(No Model.) 11 Sheets—Sheet 2.

W. W. ROSENFIELD.
APPARATUS FOR CONTROLLING HORSES.

No. 344,009. Patented June 22, 1886.

(No Model.) 11 Sheets—Sheet 3.
W. W. ROSENFIELD.
APPARATUS FOR CONTROLLING HORSES.
No. 344,009. Patented June 22, 1886.
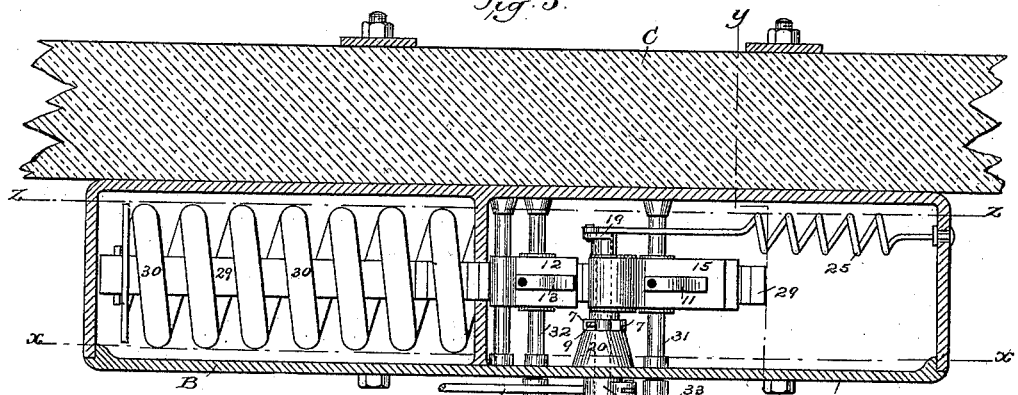
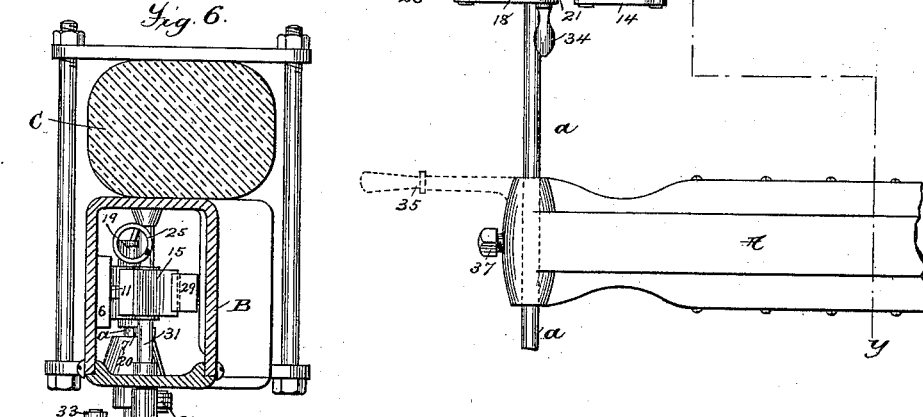
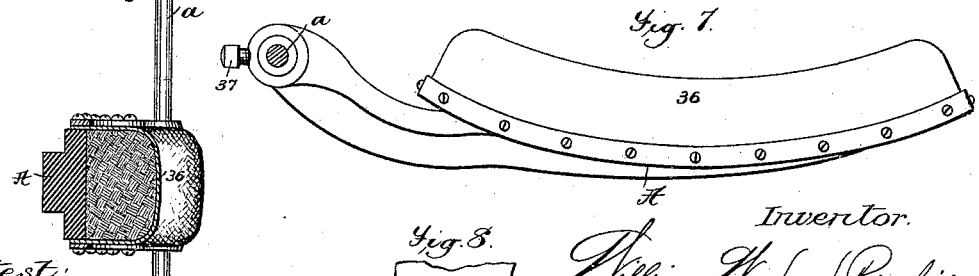
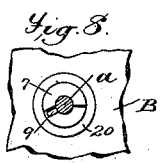
Attest:
Geo. H. Botts.
J. A. Hovey
Inventor.
William Woodward Rosenfield
By Munson & Philipp
Attys.

(No Model.)
11 Sheets—Sheet 4.

W. W. ROSENFIELD.
APPARATUS FOR CONTROLLING HORSES.

No. 344,009. Patented June 22, 1886.

Attest:
Geo. H. Bott.
J. A. Hoory

Inventor.
William Woodward Rosenfield (No Model.) 11 Sheets—Sheet 5.
W. W. ROSENFIELD.
APPARATUS FOR CONTROLLING HORSES.
No. 344,009. Patented June 22, 1886.
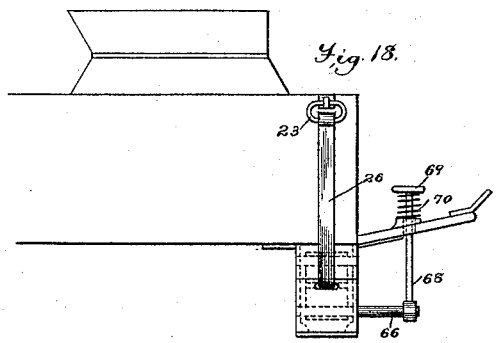
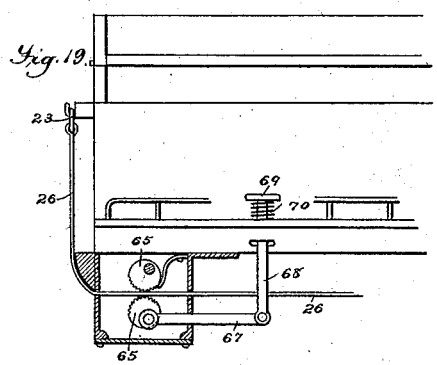
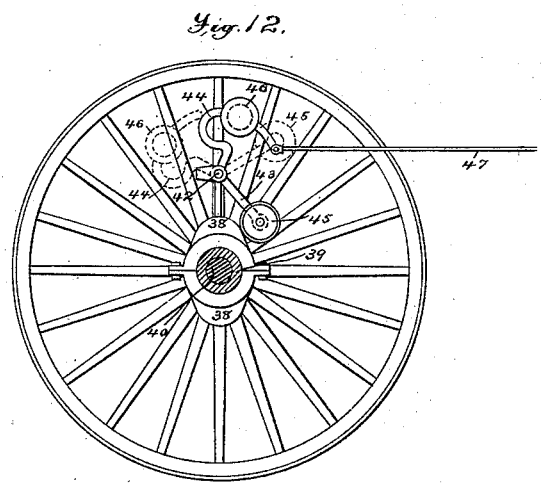
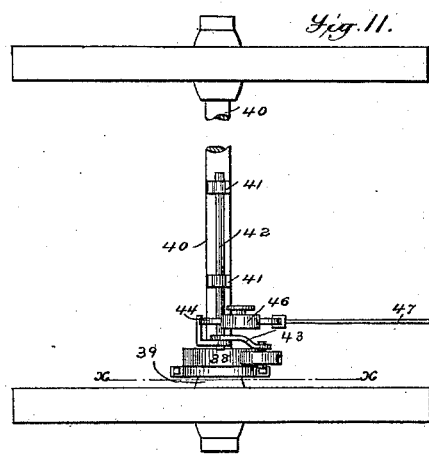
Attest:
Geo. H. Botts
J. A. Hovey
Inventor:
William Woodward Rosenfield
by Munson & Philipp
Attys.
N. PETERS, Photo-Lithographer, Washington, D. C.

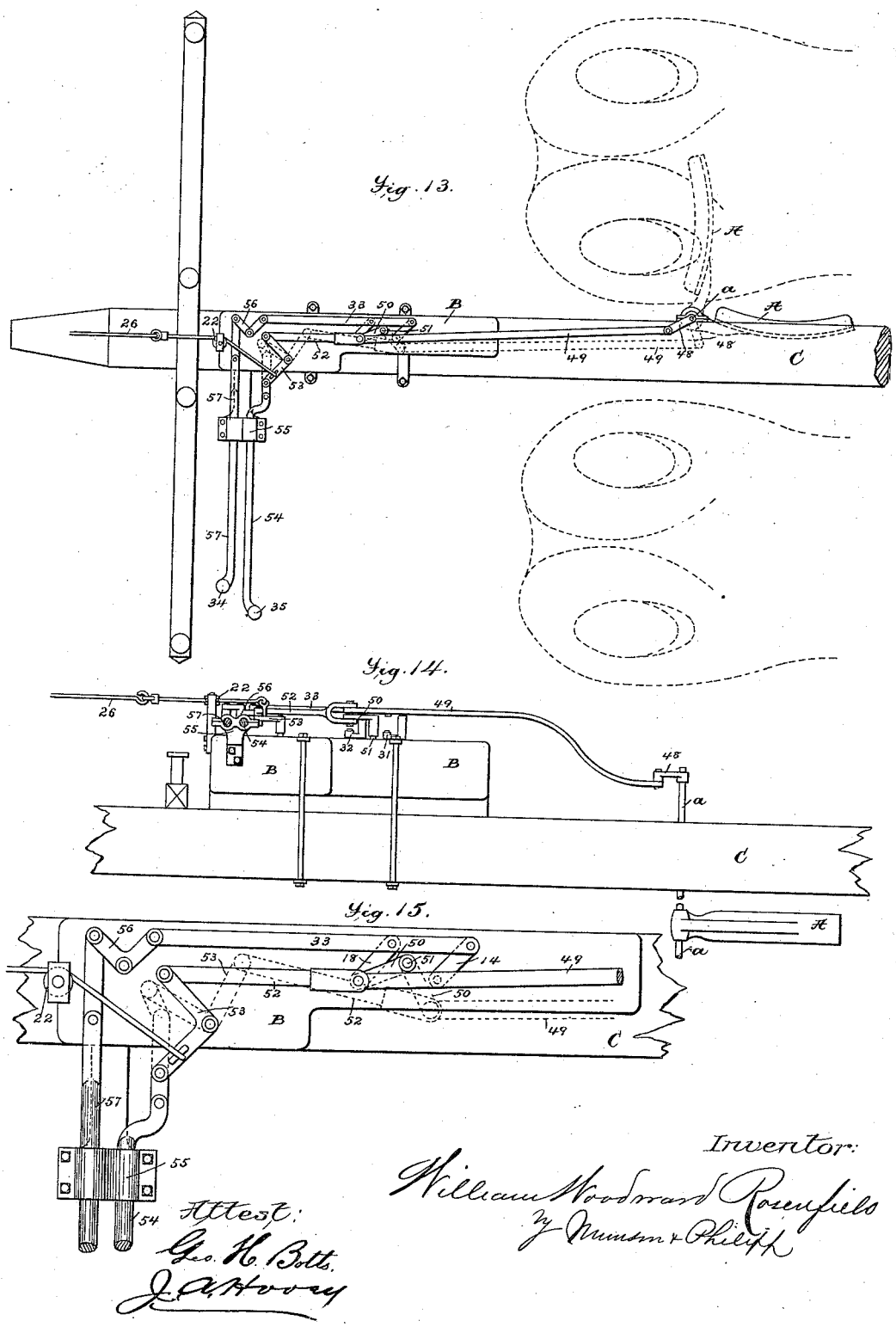

(No Model.)     W. W. ROSENFIELD.     11 Sheets—Sheet 7.
APPARATUS FOR CONTROLLING HORSES.

No. 344,009.     Patented June 22, 1886.

(No Model.) 11 Sheets—Sheet 8.
W. W. ROSENFIELD.
APPARATUS FOR CONTROLLING HORSES.
No. 344,009. Patented June 22, 1886.
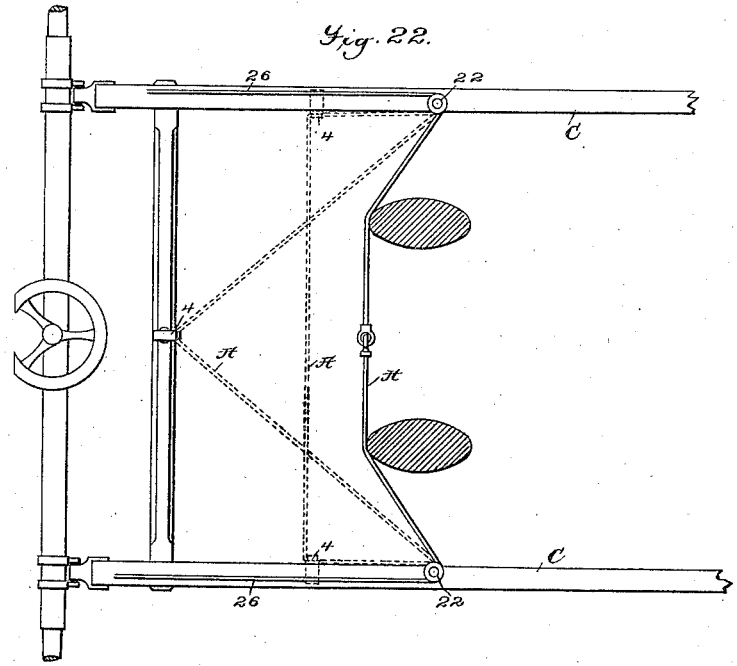
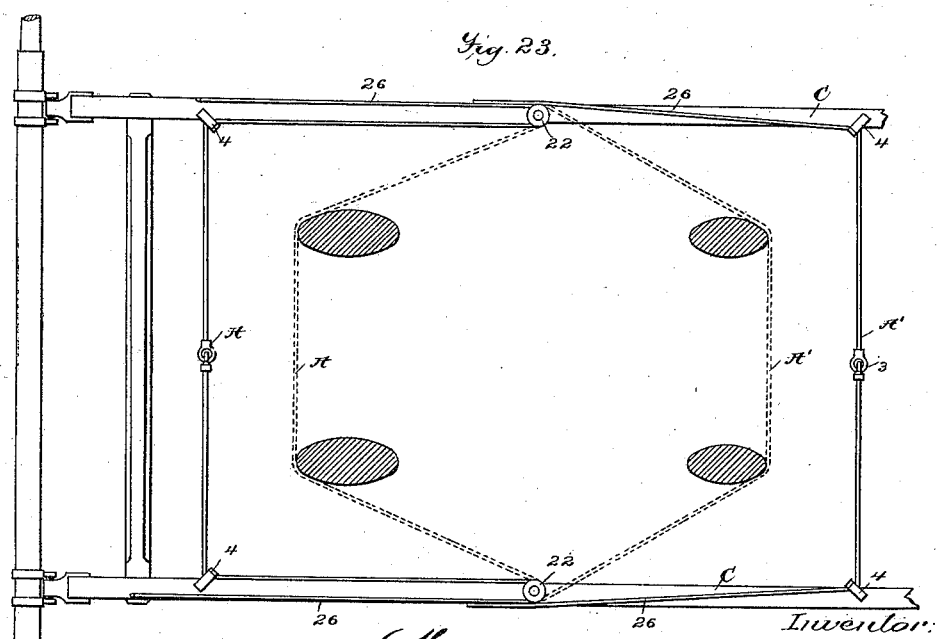

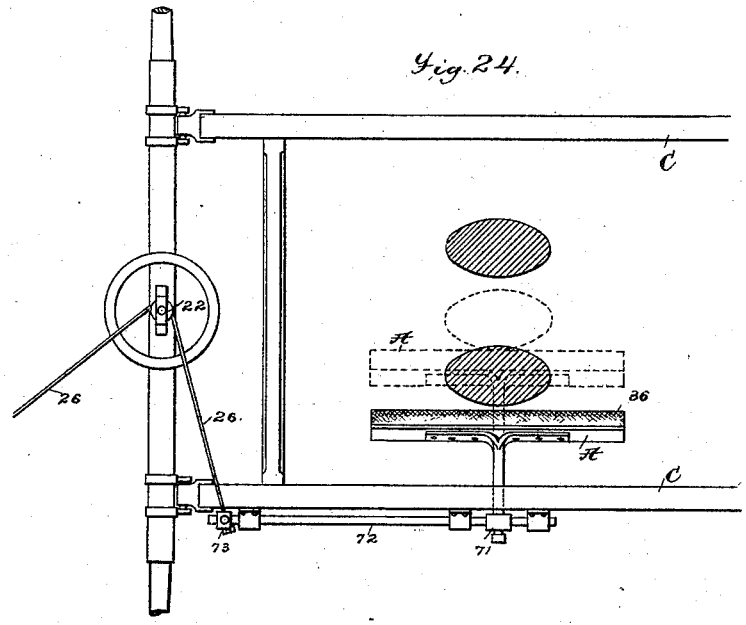
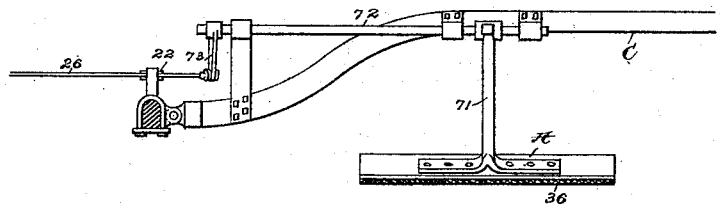

(No Model.) 11 Sheets—Sheet 10.
W. W. ROSENFIELD.
APPARATUS FOR CONTROLLING HORSES.
No. 344,009. Patented June 22, 1886.
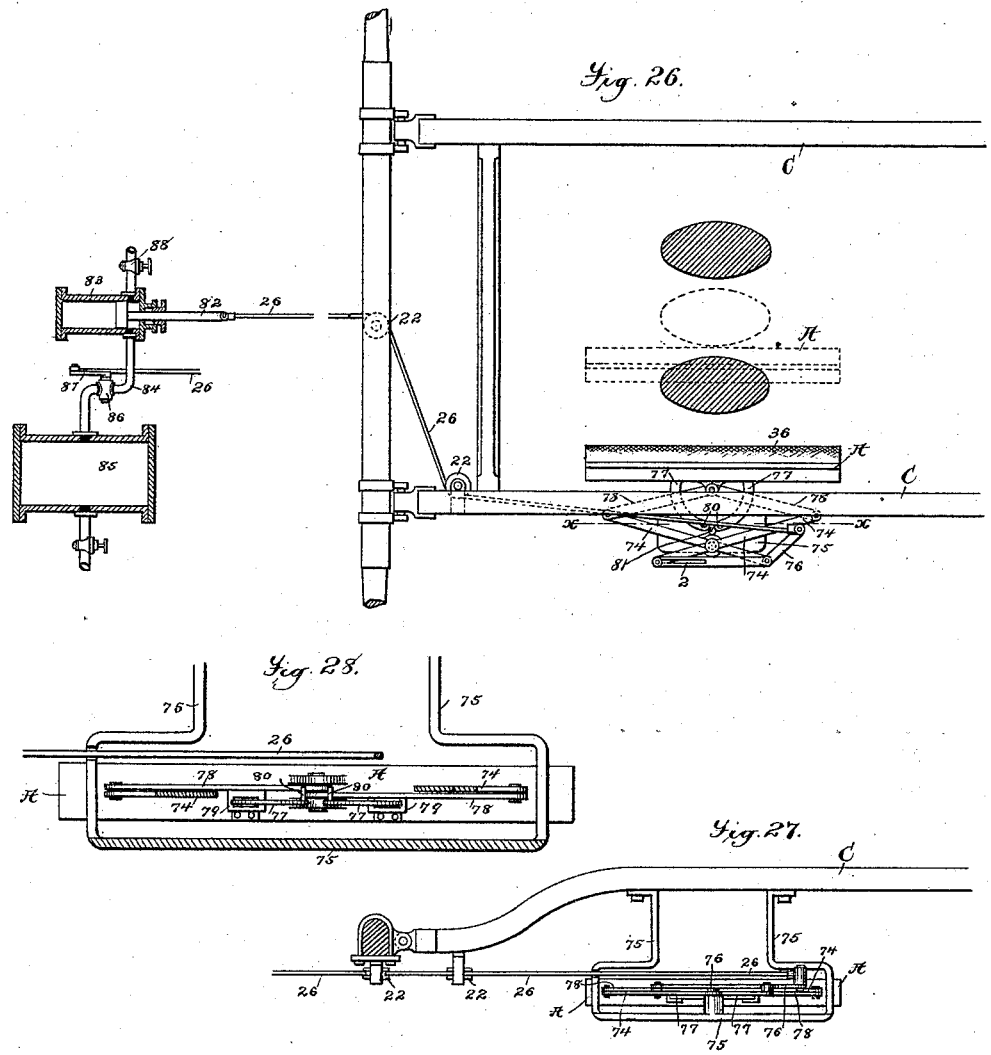

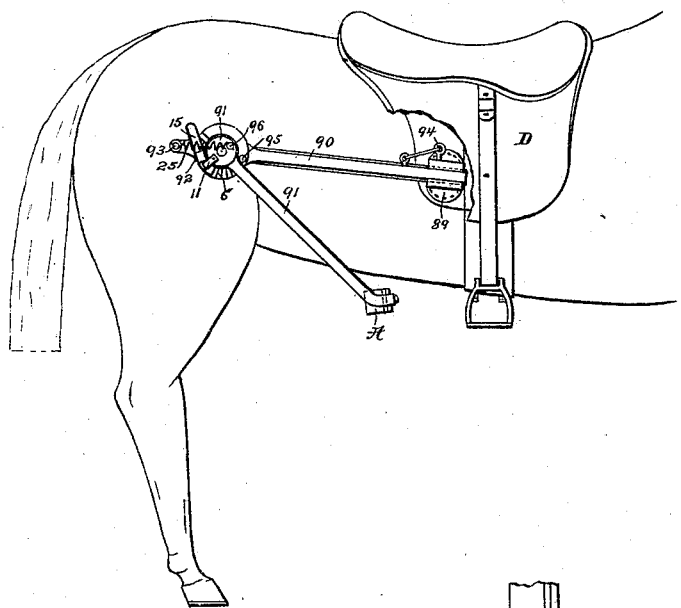

United States Patent Office.

WILLIAM WOODWARD ROSENFIELD, OF NEW YORK, N. Y., ASSIGNOR TO ANTHONY ROSENFIELD, OF SAME PLACE.

APPARATUS FOR CONTROLLING HORSES.

SPECIFICATION forming part of Letters Patent No. 344,009, dated June 22, 1886.

Application filed September 2, 1885. Serial No. 175,964. (No model.)

*To all whom it may concern:*

Be it known that I, WILLIAM WOODWARD ROSENFIELD, a citizen of the United States, residing at New York, county of New York, and State of New York, have invented certain new and useful Improvements in Apparatus for Controlling Horses and other Animals to Prevent them from Running Away, fully described and represented in the following specification and the accompanying drawings, forming a part of the same.

This invention relates to an apparatus which is designed and adapted to be applied to or used in connection with all classes of vehicles, to control the horse or horses or other draft animal or animals, and prevent it or them from running away and doing damage whenever from any cause it becomes impossible for the driver to control it or them. The apparatus can also be used to control a saddle-horse, so as to prevent it from running away when for any reason it becomes impossible for the rider to control it.

In the following description and claims the terms "horse" and "horses" will be used; but it is to be understood that by those terms is meant any draft or riding animal or animals.

The invention consists, primarily, in a device which I term an "obstructer," which is so arranged that when occasion requires it is caused to act upon one or more of the horse's legs in such manner as to impede its movements and finally bring it to a standstill.

As a full understanding of the invention can only be imparted by a detailed description of the construction and operation of the whole apparatus, all further preliminary description will be omitted and the detailed description proceeded with, reference being had to the accompanying drawings, in which—

Figure 2:
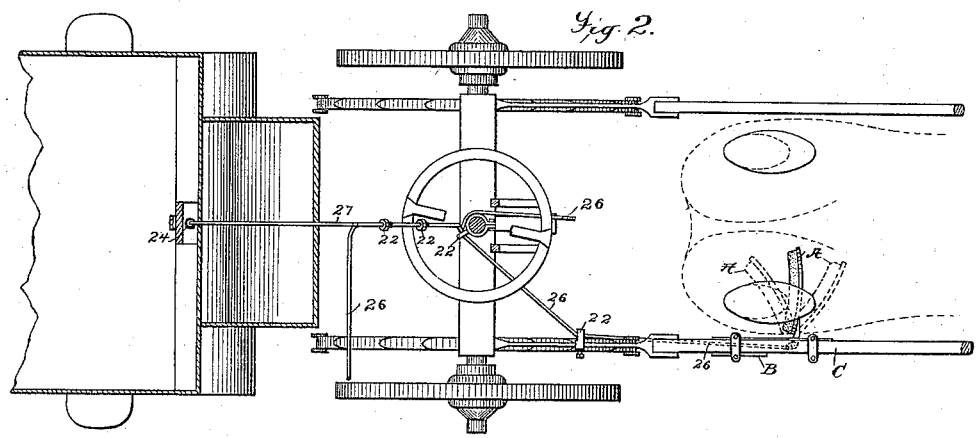
Figure 4:
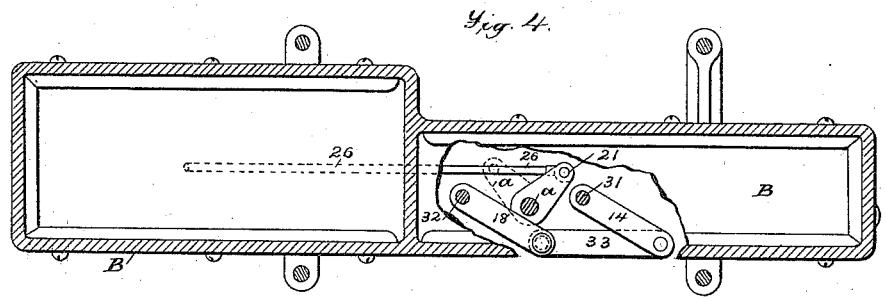
Figure 3:
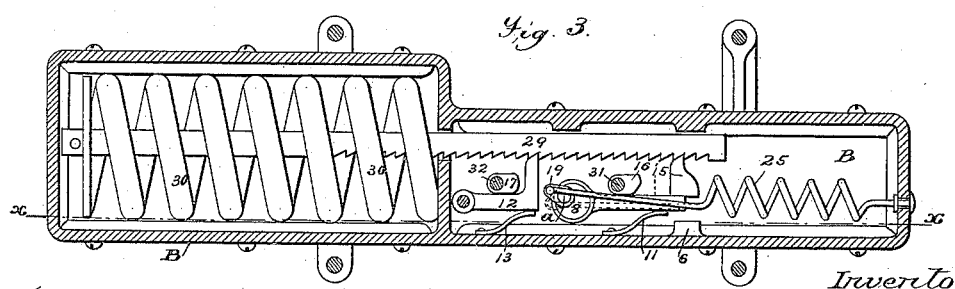
Figure 9:
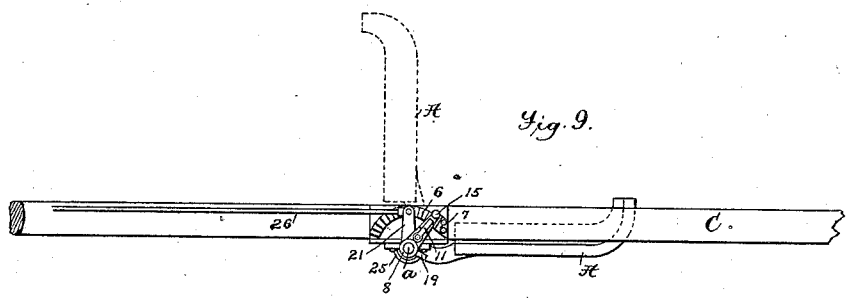
Figure 10:
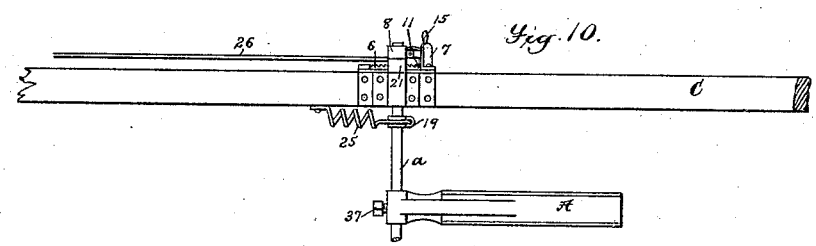
Figure 16:
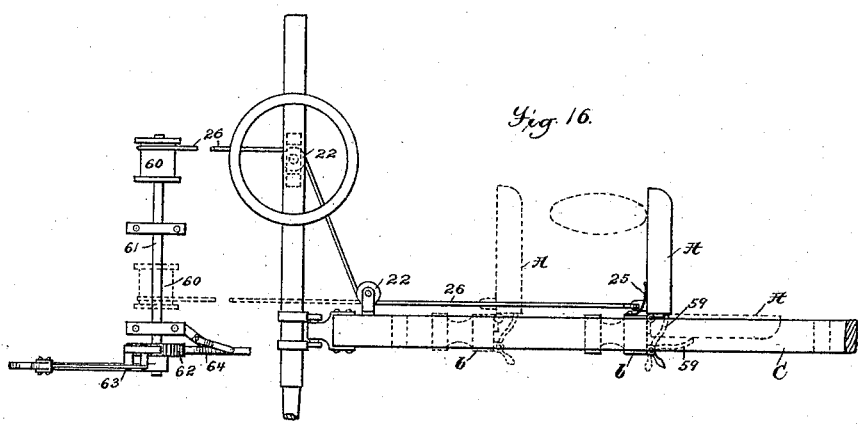

Figure 1 is a side elevation, partly in section, of an ordinary coupé, showing the invention applied thereto. Fig. 2 is an irregular horizontal section of a portion of the same, showing particularly the connections for operating the controlling or arresting mechanism proper. Fig. 3 is an enlarged horizontal section of the box or casing containing the controlling or arresting mechanism proper, the same being taken upon the line z z of Fig. 5. Fig. 4 is a similar view taken upon the line x x of the same figure, the bottom plate of the casing being partly broken away to expose the underlying parts. Fig. 5 is a vertical section of the same, taken upon the line x x of Fig. 3. Fig. 6 is a cross-section of the same, taken upon the line y y of Fig. 5. Fig. 7 is a plan view of the obstructer. Fig. 8 is a detail, which will be hereinafter referred to. Fig. 9 is a plan view of the arresting mechanism proper, showing a modification, which will be hereinafter referred to, and Fig. 10 is a side elevation of the same. Fig. 11 is a plan view, and Fig. 12 a section taken on the line x x of Fig. 11, showing a tripping mechanism or governor, which may be provided for automatically putting the controlling or arresting mechanism into operation. Fig. 13 is a plan view of a slightly-modified form of the apparatus, which is adapted for use upon two-horse vehicles. Fig. 14 is a side elevation of a portion of the same, and Fig. 15 is an enlarged view of a portion of Fig. 13. Fig. 16 is a plan view, and Fig. 17 a side elevation, illustrating another modified construction of the controlling or arresting mechanism, which will be hereinafter described. Figs. 18 and 19 illustrate details, which will be hereinafter explained. Figs. 20 to 27, inclusive, illustrate other modifications in the construction and application of the invention, which will be hereinafter explained in detail. Fig. 28 is an enlarged section taken upon the line x x of Fig. 26. Figs. 29 to 32, inclusive, illustrate one way in which the invention may be used to control or arrest a saddle-horse.

The apparatus constituting the present invention, as before stated, may be applied to or used in connection with any form of vehicle, whether mounted on wheels or upon runners. For the purpose of illustration, however, it is shown in Figs. 1 and 2 as applied to an ordinary coupé.

Referring, now, particularly to Figs. 1 and 2, it is to be understood that the arresting or controlling device A, which I term the "obstructer," and which in this case is arranged to act upon one of the hind legs of the horse, is rigidly mounted upon a shaft, a, which is supported in and extends downward from a box or casing, B, secured to one of the thills C of the vehicle. The obstructer A is so arranged that when not called into operation it lies beneath and parallel with the thill C, so as to be entirely out of the way, and not interfere with the movements of the horse, as shown in Fig. 1. When called into operation, the obstructer swings inward beneath the body of the horse and in front of its hind leg, as shown in Fig. 2, so as to prevent the movement of that leg, and thus bring the horse to a standstill.

The mechanism by which the obstructer is operated is located in the box or casing B, and will now be described.

Referring, now, to Figs. 3 to 8, it will be seen that the bottom of the casing B is provided with a boss, 20, through which the shaft a passes, and which affords a long and firm bearing for the shaft. The shaft a is provided with a stud, 9, (see Fig. 8,) which is arranged to abut against a stop, 7, on the top of the boss 20 and arrest the shaft when the obstructer is parallel with the thill, or in the position shown in Figs. 5 and 6, and also when it has reached the limit of its movement in the opposite direction. The upper end of the shaft a is provided with a crank-arm, 19, which is acted upon by a suitably-arranged spring, 25, as best shown in Figs. 3 and 5. The arm 19 is so positioned on the shaft a that when the obstructer is turned out parallel with the thill or in its normal position the arm will be slightly past the dead-point, so that the tension of the spring 25 will hold the stud 9 against the stop 7, and thus hold the obstructer in that position until the shaft a is turned sufficiently to throw the arm 19 on the other side of the dead-point, when the spring will act to turn the shaft in the opposite direction and swing the obstructer around inward beneath the body of the horse and against its leg. Just beneath the bottom of the casing B the shaft a is provided with a second crank-arm, 21, which is arranged at about right angles to the arm 19, and is connected by a suitable strap or cord, 26, which passes around pulleys or through guides, as 22, with a handle, 23, located at the driver's seat, as shown in Figs. 1 and 2. The strap or cord 26 may also be provided with a branch, as 27, which is connected to a handle, 24, located inside the vehicle, as also shown in said figures. The handle 24 inside the vehicle may, if preferred, be located in a recess or pocket and concealed by a hinged lid or door, 28, as also shown.

In addition to the arms 19 and 21, the shaft a is provided with an eccentric, 8, the band of which is provided with a crank-shaped pawl, 15, which engages with a ratchet-bar, 29, which is acted upon by a powerful spring, 30, located in the casing B. The pawl 15 is acted upon by a light spring, 11, the tendency of which is to hold the pawl in engagement with the ratchet of the bar 29. The casing B is also provided with a crank-shaped holding-pawl, 12, which is pressed by a light spring, 13, and is arranged to engage with the ratchet of the bar 29, so as to hold the bar in any position to which it is moved by the pawl 15.

In addition to the parts already named, the casing B is provided with two vertical shafts, 31 32, which lie between the pawls 12 15 and the bar 29, and which are provided with cams 16 17, which are so arranged that when the shafts 31 32 are turned they will engage with the pawls 12 15, and throw and hold them out of engagement with the ratchet of the bar 29. The shafts 31 32 extend through the bottom of the casing B, and are provided at their lower ends with arms 14 18, which are connected by a link, 33, and one of the arms is provided with a handle, 34, by which, through the link 33, the two shafts 31 32 and the cams 16 17 can be moved in unison, so as to disengage both the pawls 12 15 from the ratchet simultaneously.

The operation of the apparatus when thus organized is as follows: When the horse is hitched to the vehicle, the parts will be in the position shown in Figs. 1, 3, 4, 5, and 6—that is to say, the obstructer will be turned beneath and parallel with the thill C, which will bring the arm 19 into the position shown in Fig. 3, in which position it and the obstructer will be held by the spring 25, and the arms 14 18 will be moved so as to allow the pawls 12 15 to engage with the ratchet of the bar 29. As long as the horse remains manageable, the parts will be allowed to remain in this position. If at any time the horse should start to run, and it should become impossible for the driver to control it, or if the driver should drop the reins or be thrown from his seat, the driver or the person inside the vehicle, as the case may be, will pull upon the strap or cord 26, so as to turn the shaft a and throw the arm 19 past its dead-point, as shown by dotted lines in Fig. 3; and as soon as this is done the spring 25 will turn the shaft still further, so as to throw the obstructer A inward beneath the body of the horse and in front of its hind leg, as shown in Fig. 2, and at the same time the eccentric 8 will be turned so as to retract the pawl 15, as also shown by dotted lines in Fig. 3. As the horse moves its leg forward in taking the next step, the leg will come against and move forward the obstructer, as indicated by dotted lines in Fig. 2, so as to turn the eccentric 8, and through the pawl 15 move the bar 29 forward against the tension of the spring 30, in which position the bar will be caught and held by the pawl 12. As the horse's body is carried forward, so as to bring its leg again to the rear, the obstructer, acted on by the spring 25, will follow the leg, as shown by dotted lines in Fig. 2, so as to retract the pawl 15 and permit it to engage with the next tooth to the rear on the ratchet, so that as the horse moves its leg forward in taking the next step the obstructer will be again moved forward, thereby again moving the ratchet-bar 29, and still further contracting the spring 30. This will be repeated at each step of the horse, the bar 29 being gradually moved forward and the spring 30 contracted until the resistance offered by the obstructer is sufficient to prevent the forward movement of the horse's leg, and the horse is thus brought to a standstill. When the horse has been thus brought to a standstill, the handle 34 will be operated, either directly or by a strap or cord leading to the driver's seat or to the inside of the vehicle, so as to turn the shafts 31 32, and cause the cams 16 17 to disengage the pawls 12 15 from the ratchet of the bar 29. This will allow the spring 30 and bar 29 to resume their normal position, after which the obstructer A can readily be turned back to its normal position, (for which purpose it may be provided with a small handle, as 35, as shown in dotted lines in Fig. 5,) where it will be held by the spring 25.

The obstructer A is made adjustable vertically upon the shaft a, so that it can be set to act upon the horse's leg at the proper point. For this purpose it is provided with a set-screw, as 37, by which it can be secured in any position to which it is adjusted. The obstructer is also provided with a suitable cushion or padding, as 36, to protect the horse's leg from injury.

In addition to stopping the horse when it attempts to run away, it is also desirable to have means by which it can be prevented from walking or running away when left standing. This result can also be readily accomplished by the apparatus just described. To do this it is only necessary, when the horse is left without an attendant, to turn the obstructer inward in front of its leg, the same as just described. If the horse then attempts to walk or run away, the obstructer will be operated in the manner just described, to bring the horse to a standstill as soon as it has proceeded a short distance.

Although the organization just described, by which the obstructer is operated so as to offer a gradually-increasing resistance to the horse's leg, and thus bring the horse to a standstill gradually, is preferred, and will in most cases be employed, there are some circumstances in which it is desirable to bring the horse to a standstill suddenly, or to prevent it from moving at all. For this purpose the casing B is provided with a stop, 6, which is so arranged that by operating the cam 16, when the pawl 15 is in its retracted position, the end of the pawl can be thrown and held behind the stop, so as to lock the obstructer in its rearmost position and prevent any forward movement of the horse's leg. When, therefore, it is desired to stop the horse suddenly, or, when standing still, to prevent it from moving at all, the shaft a will be turned, either by the strap 26 or otherwise, so as to turn the obstructer inward in front of the horse's leg, or to allow the spring 25 to do so, after which the cam 16 will be turned so as to throw and hold the end of the pawl 15 behind the stop 6, thus holding the obstructer rigidly, and preventing any forward movement of the horse's leg.

Although, as before stated, it is preferable that the obstructer should in most cases be so operated as to offer a gradually-increasing resistance to the horse's leg, yet it may be arranged to operate positively in all cases. This can be accomplished in the construction shown in Figs. 1 to 8 by simply omitting the spring 30, bar 29, pawl 12, shafts 31 32, and cams 16 17, and arranging the spring 11 to act upon the opposite side of the pawl 15. When this is done, the pawl 15 will engage with the stop 6 and lock the obstructer whenever the latter is turned inward in front of the horse's leg.

Figs. 9 and 10 show an organization in which the same result is accomplished in a slightly-different manner. In this case the casing B is entirely dispensed with, the shaft a being supported in a bearing on the side of the thill C. The spring 25 is arranged to act only to hold the obstructer in its normal position. The pawl 15, instead of being connected to the band of an eccentric upon the shaft a, is mounted upon the end of an arm, 8, extending from the shaft, and, instead of abutting against a stop, 6, engages with a segmental-shaped ratchet, 6, located on the top of the thill C, and the stop 7, instead of acting upon a stud, 9, acts upon the arm 8. With the apparatus thus organized the entire inward movement of the obstructer is effected by the strap 26. Whenever the obstructer is to be brought into operation, the strap 26 is drawn upon so as to overcome the tension of the spring 25 and throw the obstructer inward, as indicated by the dotted lines in Fig. 9, and as this is done the pawl 15 is retracted along the ratchet 6, so as to engage with the ratchet and hold the obstructer rigidly in any position to which it is moved, thereby positively arresting the forward movement of the horse's leg. To restore the obstructer to its original position, it is only necessary to raise the pawl 15 out of engagement with the ratchet 6, when the spring 25 acts to at once turn the obstructer back to a position parallel with the thill C.

In addition to the connections by which the obstructer can be thrown into operation from the driver's seat or from the inside of the vehicle, it is also desirable to have means provided by which, in case the horse should start to run when there is no one in the vehicle, the obstructer will be automatically thrown into operation. This may be readily accomplished by providing the strap 26 with a branch, which is connected with a tripping mechanism, which is so arranged that whenever the vehicle moves above a certain speed it will draw upon the strap 26 and turn the shaft a so as to throw the obstructer into operation. Such a tripping mechanism as this may be constructed and operated in a great variety of ways. One form, however, which is suitable for the purpose is illustrated in Figs. 12 and 13. This mechanism, which is applied to the axle of the vehicle, (the rear axle in the case of a four-wheel vehicle,) consists of an oval-shaped cam, 38, which is made in two parts, which are clamped together around the inner end of the hub 39 of one of the wheels, as shown in Fig. 12, so as to turn with the wheel. The axle 40 is provided with suitable arms, 41, which afford bearings for a small rock-shaft, 42, having two arms, 43 44, one of which, 43, is provided with a small roll, 45, which rests upon the periphery of the cam 38, while the other, 44, is provided with a weight, 46, and is connected by a strap or cord, 47, (see Fig. 1,) with the branch 27 or the main strap or cord 26. The arms 43 44 are so shaped and arranged that so long as the roll 45 remains on the cam 38 the tendency of the weight 46 will be to hold it there, but that whenever the roll 45 is raised a short distance away from the cam the weight 46 will be thrown on the other side of the shaft 42, and thereby draw upon the strap 47. From this arrangement it results that so long as the vehicle is moving at a moderate speed the roll 45 will simply ride upon the periphery of the cam 38, rising and falling in conformity with the shape of the cam. As soon, however, as the vehicle attains an undue amount of speed, as will be the case when the horse is running away, the projecting portions of the cam 38, acting suddenly upon the roll 45, will throw it away from the cam sufficiently to throw the weight 46 past the center of the shaft 42, thus allowing the weight to act upon the strap 47 and turn the shaft $a$ so as to throw the obstructer into operation. The weight 46 is made adjustable upon the arm 44, so as to determine the speed of the vehicle at which the tripping mechanism will act. It will also be seen that a tripping mechanism may be readily arranged which can be operated by an ordinary ball or centrifugal governor connected with the wheel of the vehicle.

The drawings thus far referred to show the apparatus as applied to a one-horse vehicle, in which case the obstructer is applied to one of the thills. It is to be understood, however, that each of the thills may be provided with one of the obstructers, so that instead of one both of the horse's hind legs will be acted upon. In such case the apparatus upon the two thills will be simply duplicates, and they may be operated by separate straps or cords, as 26, or by a single strap or cord having branches connected to both obstructers. It is also to be understood that the obstructer can be applied to two-horse vehicles equally as well as to one-horse vehicles. In such case the obstructer will be applied to the tongue of the vehicle, and may be arranged to operate in either of the ways already described. There may be two of the obstructers, one arranged to be turned out from one and the other from the other side of the tongue, so that one leg of each horse will be acted upon, or there may be only one of the obstructers, so that the leg of only one of the horses will be acted upon.

Figs. 13, 14, and 15 illustrate the application of one form of the apparatus to a two-horse vehicle. This apparatus is substantially the same as that shown in Figs. 1 to 8; but the arrangement and connections are somewhat modified. The box or casing B, instead of being secured beneath the thill, is mounted upon the top of the tongue C, and is located somewhat further to the rear, and the shaft $a$, to which the obstructer A is fixed, instead of entering the casing B, is mounted in a bearing secured to the side of the tongue in advance of the casing. The shaft $a$ is provided with a crank-arm, 48, which is connected by a link, 49, with a crank-arm, 50, which is secured to a short shaft, 51, which enters the casing B, and is provided with the arm 19 and spring 25, and the eccentric 8 and pawl 15, which parts are mounted upon the shaft $a$ in the construction first described. The arm 50, instead of being connected directly to the strap 26, as is the arm 21 in the first construction, is connected to a link, 52, which in turn is connected to one arm of a lever, 53, the other arm of which is connected to the strap. The arm of the lever 53, to which the strap 26 is connected, is also connected to a rod, 54, which slides in a bearing, 55, secured to the side of the casing B, and extends outward behind one of the horses. The link 33, which connects the arms 14 18 of the shafts 31 32, upon which the cams 16 17 are mounted, is extended and connected to one end of a lever, 56, the other end of which is connected to a rod, 57, which also slides in the bearing 55, and extends outward by the side of the rod 54. The ends of the rods 54 57 are respectively provided with the handles 35 34.

The operation of the apparatus when thus constructed is as follows: When the horses are attached to the vehicle, the obstructer A will be turned to the position shown in Figs. 13 and 14, and the rod 57 will be pushed inward, so as to turn the shafts 31 32 and throw the cams 16 17 from the pawls 12 15 and allow the pawls to engage with the ratchet of the bar 29. When the parts are in this position, and it is desired to bring the obstructer into operation, it is only necessary to pull upon the strap 26, the same as already described. This will operate the lever 53, and through the link 52 and arm 50 rock the shaft 51, so as to throw the arm 19 past the dead-point and permit the spring 25 to act upon the shaft, and through the arm 50, link 49, and arm 48 turn the obstructer inward beneath the body of the horse and in front of its leg, as shown by dotted lines in Fig. 13. The operation of the obstructer in bringing the horses to a standstill will then be the same as already described. When the horses have been stopped, the parts can be restored to their normal position by pulling upon the rod 57, so as to cause the cams 16 17 to disengage the pawls 12 15 from the ratchet of the bar 29, and then pulling upon the bar 54, so as to swing the obstructer back to its original position, and at the same time throw the arm 19 past the dead-point, so that the spring 25 will hold the obstructer in that position. When the obstructer is applied to the tongue of a vehicle, the strap 26 will of course pass directly back to the king-bolt, instead of inward from one side to the king-bolt. The obstructer A in this case, the same as in the case of a one-horse vehicle, may be arranged to operate positively, as already described; and, if preferred, the tongue C may be provided with two of the obstructers, one for acting upon the leg of each horse.

Figure 17:
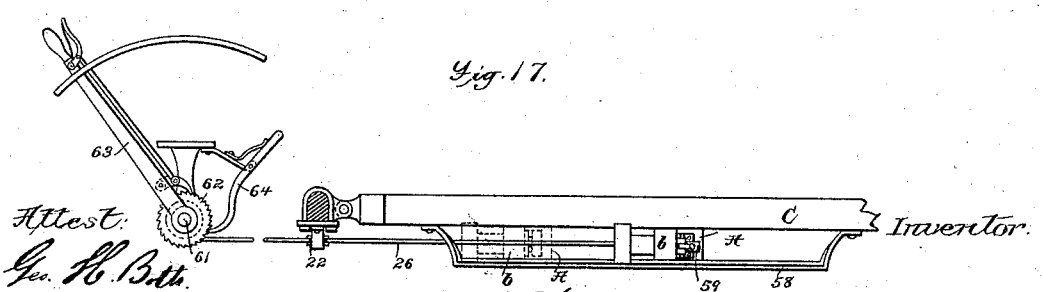

The obstructer A, instead of being arranged to swing directly inward against the horse's leg, as hereinbefore described, may be arranged to swing inward beneath the horse's body, and then move backward against its leg, and in thus moving backward against the horse's leg the obstructer may act positively or yieldingly, as may be preferred. Figs. 16 and 17 illustrate one organization of this character, in which the obstructer is arranged to be swung inward beneath the horse's body, and then moved backward positively against its leg. As shown in these figures, the obstructer A is hinged to a head, $b$, which is arranged to slide in a suitable guide, 58, secured beneath the thill C or the tongue, and is provided with a spring-pressed dog, 59, which acts, when the obstructer has been turned inward beneath the horse's body, to hold it rigidly in that position. The head $b$ is also provided with a light spring, 25, which acts upon the obstructer to hold it in its normal position beneath the thill or tongue. The strap or cord 26 is attached to a short arm or stud extending inward from the obstructer, and, passing through or around suitable guides or pulleys, 22, is attached to a drum or windlass, 60, the shaft 61 of which is supported beneath the body of the vehicle, and is provided with a ratchet, 62, and a ratchet-lever, 63, the end of which is in position to be operated by the driver. The ratchet 62 is also provided with a holding-pawl, 64, which acts to hold the drum 60 in any position to which it is turned by the ratchet-lever 63. In the case of a one-horse vehicle the strap 26 may pass inward to the king-bolt, and then to the drum 60, as shown in Fig. 16, or it may pass directly back to the drum, as shown by dotted lines in said figure. In the latter case the strap 26 must be sufficiently slack to allow for the turning of the vehicle.

With the apparatus thus organized the operation is as follows: Under ordinary circumstances the obstructer will be turned out beneath the thill or tongue and in line with the head $b$, as shown by dotted lines in Fig. 16. When, however, it is desired to bring it into operation to stop the horse, the ratchet-lever 63 will be operated so as to turn the drum 60 and draw upon the strap 26. This will overcome the spring 25 and swing the obstructer inward to the position shown by full lines in Fig. 16, in which position it will be held by the dog 59, after which, the drawing upon the strap 26 being continued, the obstructer and the head $b$ will be moved rearward positively, as shown by dotted lines in Fig. 16, so as to prevent the forward movement of the horse's leg and bring it to a standstill.

It is to be understood that the drum 60 can be operated by any other suitable mechanism instead of by the ratchet and ratchet-lever. For example, it may be operated by a crank or hand wheel, the shaft of which is provided with a worm which engages with a worm-gear upon the shaft of the drum; or the strap 26, instead of being attached to a drum, may be drawn upon by the driver directly. An arrangement for this purpose is illustrated in Figs. 18 and 19, in which the strap 26, after passing through suitable guides, terminates in a ring or handle, 23, at the driver's seat. In this case the driver, by drawing upon the strap, first swings the obstructer inward, and then moves the obstructer and the head $b$ rearward, the same as already described.

In order to hold the obstructer in any position to which it may be drawn, the strap may be provided with a suitable clamping device. As shown in Figs. 18 and 19, this device consists of two eccentric rolls or segments, 65, which are arranged upon opposite sides of the strap, and so as to nip it between them. The shaft 66 of one of these rolls is provided with an arm, 67, to which is connected a rod, 68, having a pedal, 69, which is arranged to be operated by the driver's foot. The rod 68 is provided with a spring, 70, which is arranged to normally hold the rod and the pedal 69 elevated, and thus prevent the rolls 65 from nipping the strap 26. By means of this arrangement it is only necessary, when the obstructer has been drawn rearward to the proper point, to depress the pedal 69, and this will cause the rolls 65 to nip the strap, and thus hold the obstructer firmly. If preferred, the head $b$ may be provided with a spring and a pawl-and-ratchet mechanism, similar to the spring 30 and the pawl-and-ratchet mechanism shown in Figs. 1 to 8, by which the obstructer and the head will be gradually moved rearward, so as to offer a gradually-increasing resistance to the horse's leg.

Figure 20:
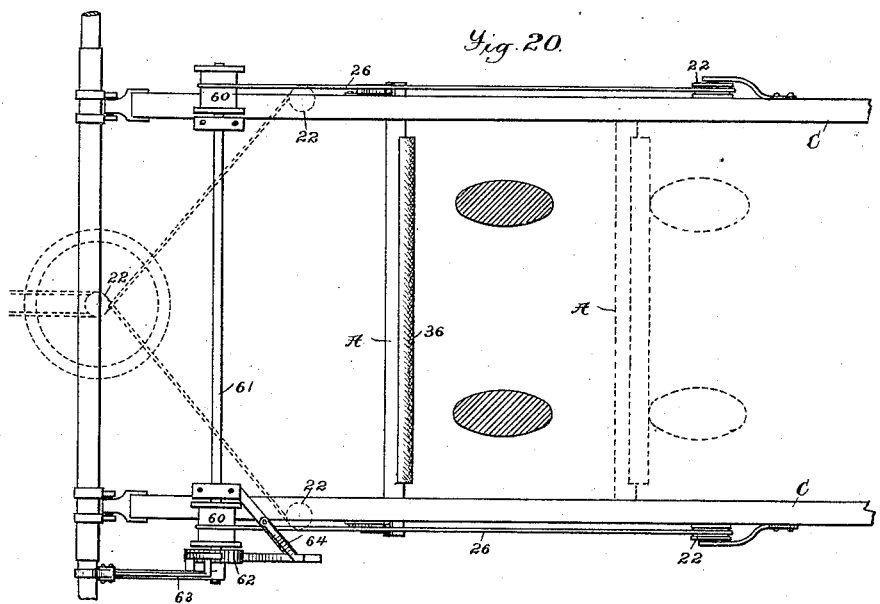
Figure 21:
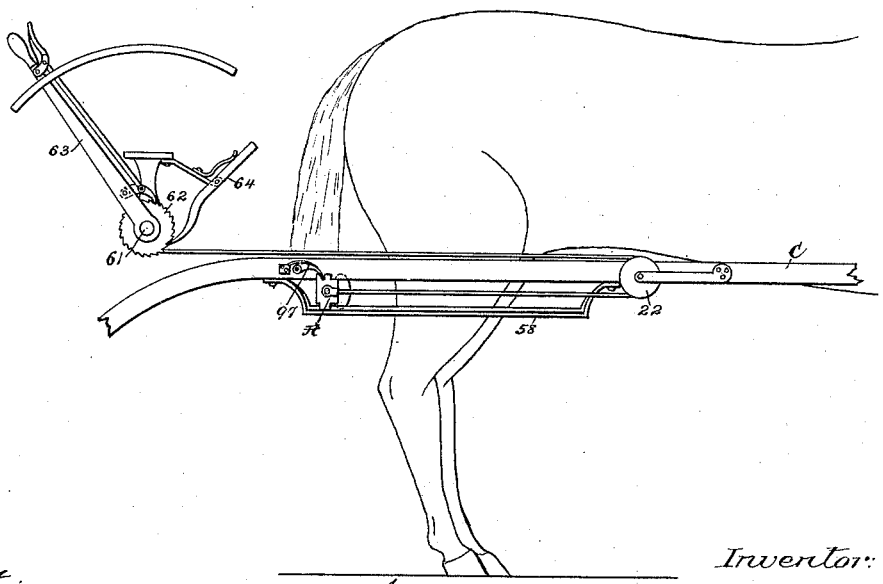

The obstructer in any of its forms may be arranged to act upon the horse's fore leg or legs instead of its hind leg or legs, or upon the rear instead of the front of the horse's leg or legs. In those cases where the obstructer is of the swinging form this can be effected by arranging the obstructer to turn inward behind instead of in front of the horse's leg, and in the case of the construction shown in Figs. 16 and 17 the head $b$ will be moved forward instead of rearward. When the obstructer is arranged to act in this manner, the horse, instead of being prevented from moving its leg forward to take a step, will have its leg held in its forward position, which will effect the same result—that is, to bring the horse to or hold it at a standstill. When the obstructer is arranged to act from the rear, it may be in the form of a bar arranged to extend from one to the other of the thills C, as shown in Figs. 20 and 21. In these figures the obstructer A is in the form of a bar extending the entire distance between the thills C, and has its ends arranged to slide freely in supports 58, secured beneath the thills. In this case there are two of the straps 26, one for each end of the obstructer, and in order to move the obstructer forward they pass forward through guides or around pulleys 22, and thence return directly to the drums 60, mounted upon the shaft 61, as shown by the full lines in Fig. 20, or around pulleys or guides 22 and inward to the king-bolt, as shown by dotted lines, and to a single drum, arranged as shown in Fig. 16; or they may unite and be led to the driver's seat, as shown in Figs. 18 and 19.

The operation of the apparatus when thus organized is the same as already described. By drawing upon the straps 26, either by turning the drum or drums 60, or otherwise, the obstructer is moved forward against the horse's legs, so as to arrest and hold them in their forward position, as shown by dotted lines in Fig. 20, and thus bring the horse to a standstill. In the construction just described one or both of the thills C may be provided with a spring-catch, as 97, which will act to hold the obstructer in its rearmost position until the straps 26 are drawn upon. The head b of the construction shown in Figs. 16 and 17 may be provided with a similar catch.

The obstructer, instead of being a rigid bar, as shown in Figs. 20 and 21, may consist of a flexible strap connecting the straps 26; or it may be formed by extending and uniting the ends of the straps 26, as shown in Fig. 22. In this case, when the obstructer is not in use, it will be drawn back and secured either to one or to two hooks, 4, as shown by dotted lines. The hooks 4 will be made yielding, so that when the straps 26 are drawn upon they will yield and release the obstructer, and allow it to be drawn forward against the horse's legs, as shown by the full lines. In this case one of the straps 26 may be omitted, one end of the obstructer being secured to the thill at the point occupied by the pulley 22.

In addition to the obstructer A, arranged to act upon the horse's hind legs, there may also be provided a supplemental obstructer, as A', arranged to act upon the horse's fore legs, as shown in Fig. 23. The supplemental obstructer will be held away from the horse when not in use by yielding hooks 4 upon the forward ends of the thills. The straps 26 of the obstructer A' may be connected to the straps 26 of the obstructer A, or they may be connected to the drum or drums 60, or other operating mechanism, the same as the other straps.

The supplemental obstructer A' will be provided with a hook or buckle, as 3, by which it can be separated, so as to permit the horse to be placed between the thills. The strap or straps 26 can in either of these cases be arranged and operated in any of the ways already described.

The obstructer in either of the forms just described may be readily applied to two-horse vehicles by providing suitable suspending-brackets extending laterally from the tongue.

The obstructer, instead of being arranged to act upon the front or rear of the horse's leg, may be arranged to act upon the side of the leg. This may be effected in a variety of ways, two of which are illustrated in Figs. 24 to 28.

As shown in Figs. 24 and 25, the obstructer A is mounted upon the end of an arm, 71, which depends from a horizontal rock-shaft, 72, which is mounted in bearings upon the thill C or the tongue, and is provided with an arm, 73, to which is connected the strap 26, which passes around a pulley, 22, and is operated in any of the ways already described. So long as the obstructer is not in use it hangs directly downward beneath the thill or tongue, and is out of the way. When, however, it is desired to put it in operation, the strap 26 is drawn upon, so as to swing the obstructer inward against the side of the horse's leg, as shown by dotted lines in Fig. 24, thereby crowding the leg over to one side and preventing it from being moved.

In the organization shown in Figs. 26, 27, and 28 the obstructer, instead of being mounted upon an arm, 71, and arranged to swing inward, is connected by a pair of links, 78, to the arm 74 of a pair of lazy-tongs, which are fulcrumed in a frame, 75, secured to the thill C or the tongue, and are provided with a crank-shaped lever, 76, which is fulcrumed to one of the arms 74 of the lazy-tongs, and is connected at one end to the strap 26, and provided at its other end with a slot, 2, in which plays a stud upon the other arm 74 of the tongs.

The obstructer is provided with two curved arms, 77, which pass through loops 79 upon the links 78, (see Fig. 28,) and are provided at their ends with studs 80, which engage with the loops 79 and links 78, and the frame 75 with a stud, 81, which engages with the arms 74 of the lazy-tongs, so as to hold the obstructer parallel with the thill C when the former is forced inward against the horse's leg. From this arrangement it will be readily seen that by drawing upon the strap 26 and lever 76 the lazy-tongs 74 will be closed, so as to force the obstructer inward and crowd the horse's leg over to one side, as shown by dotted lines in Fig. 26. The strap 26 may be drawn upon to accomplish this result in any of the ways already described. As shown in Fig. 26, however, the strap is connected to the piston-rod 82 of a small cylinder, 83, which communicates by a pipe, 84, with a tank, 85, which is filled with compressed air. The pipe 84 is provided with a cock or valve, 86, the plug or stem of which is provided with a lever, 87, to which is attached a strap or cord, 26, leading to the driver's seat, or to the inside of the vehicle, or to the automatic tripping mechanism hereinbefore described, or to all three. By means of this arrangement it is only necessary, in order to throw the obstructer into operation, to draw upon the strap 26, so as to open the cock or valve 86. This will allow the compressed air contained in the tank 85 to pass into the cylinder 83 and move its piston so as to draw upon the strap 26, and thus, through the lever 76 and lazy-tongs 74, force the obstructer inward.

As shown in Fig. 26, the cylinder 83 is provided with a relief-cock, 88, by which the air can be let out of the cylinder after it has operated the piston. The same result may be accomplished by making the cock 86 a three-way cock, so that it can be operated to open communication between the cylinder 83 and the tank 85, and also between the cylinder and the open air.

The strap 26 may, as before stated, be operated to open the cock or valve 86, either by the driver or the person inside the vehicle, or by the tripping mechanism.

The cylinder 83, instead of being provided with a piston, may be provided with a flexible diaphragm, upon which the air will act in the same manner.

The compressed-air apparatus just described may of course be used in connection with any of the other organizations hereinbefore described.

The connections 26 27 47, by which the obstructer is operated, either from the driver's seat, or from the inside of the vehicle, or from the tripping mechanism, have been referred to as straps or cords. It is to be understood, however, that these connections may consist of chains, or may be made up partly or wholly of rigid rods, links, and levers. In fact it is to be understood that any suitable form of connecting devices may be employed for transmitting motion from the tripping mechanism, or from the handle located inside the vehicle, or from the handle at the driver's seat, to the arresting mechanism located upon or attached to the thill or tongue of the vehicle.

It is often desirable that the same vehicle should be arranged so that it can be provided either with a tongue or thill, or so that these can be used interchangeably. In such cases the connection 26 will preferably be branched at the king-bolt, as shown in Figs. 1 and 2, one branch passing directly forward, so as to be connected to the arresting mechanism upon the tongue, and the other passing outward, so as to be connected to the arresting mechanism upon the thill.

It has already been said that the present invention can be used to control a saddle-horse as well as a horse or horses attached to a vehicle. Figs. 29 to 32 illustrate the invention as applied to this purpose. To accomplish this the rear part of the saddle D is provided with a dovetail bearing, 89, which supports an arm, 90, which extends rearward along the side of the horse, terminating at a point about opposite its hip-joint. The arm 90 is provided at its end with a pivoted arm, 91, which extends downward and forward to a point below the horse's body, and carries at its end the obstructer A, which extends at right angles to the arm 91 beneath the horse's body. The arm 91 is provided with a stud, 92, to which is pivoted a pawl, 15, which is pressed by a spring, 11, and engages with a segmental ratchet, 6, formed upon the end of the arm 90. The arm 91 is also provided at a short distance from its pivot with a stud, 96, to which is connected a spring, 25, the opposite end of which is attached to a stud, 93, extending from the arm 90. The stud 92 is so positioned with relation to the pivot of the arm 91 that when the obstructer A is swung up close beneath the horse's body, as shown in Fig. 29, the stud will be above the dead-point, (as best shown in Fig. 31,) and will consequently act to hold the obstructer and the arm 91 in that position. The movement of the obstructer in this direction is limited by a stop, 95, projecting from the arm 90.

The operation of the apparatus when thus organized is as follows: So long as the horse remains manageable the parts will be allowed to remain in the position shown in Fig. 29, the obstructer being held up close beneath the horse's body by the spring 25. If, however, the horse attempts to run, and it is desired to arrest it, the rider, by moving his foot rearward, can press against the arm 91 or the end of the obstructer, so as to swing it downward a short distance, thus bringing the stud 92 below the dead-point of the pivot of the arm 91, so that the spring 25 will immediately act to throw the arm 91 and the obstructer rearward against the horse's leg. As the obstructer is thus moved rearward, the pawl 15 will engage with the teeth of the ratchet 6, so as to hold the obstructer in any position to which it is moved by the spring, and thus prevent the horse from moving its leg forward, and bring it to a standstill. The arm 90 is arranged to slide into the dovetail bearing 89, and is held in position therein by a removable pin, 94, as shown in Fig. 32, so that by removing the pin the apparatus can be readily detached from the saddle, thus permitting the saddle to be used without the arresting mechanism whenever it is desired to do so.

If saddles as ordinarily constructed should not be found sufficiently rigid to properly support the apparatus in the manner just described, the portion of the saddle to which the bearing 89 is attached can readily be made stiff and rigid for this purpose by providing additional braces or straps, as may be found necessary. It is also to be understood that, if desired, each side of the saddle may be provided with one of the apparatuses, so that both of the horse's legs will be acted upon instead of one.

It will of course be seen that the apparatus just described can be used to hold the horse when standing, as well as to arrest it when running; and it will also be seen that other forms of the apparatus can be used upon saddle-horses, as well as the particular form shown.

What I claim is—

1. The obstructer A, supported out of contact with the horse's leg or legs when not in use, but arranged to be brought against the horse's leg or legs to obstruct its or their movement, and thus arrest or hold the horse, substantially as described.

2. The combination, with the vehicle, of the obstructer A, supported upon the vehicle out of contact with the horse's leg or legs, but arranged to be brought against the horse's leg or legs to obstruct its or their movement, and thus arrest or hold the horse, substantially as described.

3. The combination, with the obstructer A, supported out of contact with the horse's leg or legs when not in use, of means for bringing and holding the same against the leg or legs of the horse, so as to obstruct its or their movement, and thus arrest or hold the horse, substantially as described.

4. The combination, with the vehicle, of the obstructer A, supported thereon out of contact with the horse's leg or legs, and means operated from the vehicle for bringing and holding the obstructer against the leg or legs of the horse, so as to obstruct its or their movement, and thus arrest or hold the horse, substantially as described.

5. The combination, with the vehicle, of the obstructer A, supported thereon out of contact with the horse's leg or legs, and mechanism operated from the vehicle for bringing and holding the obstructer against the leg or legs of the horse with a gradually-increasing pressure, so as to obstruct its or their movement, and thus arrest or hold the horse, substantially as described.

6. The combination, with the vehicle, of the obstructer A, supported thereon, and means operated from the vehicle for bringing and holding the obstructer against the leg or legs of the horse, so as to obstruct its or their movement, and thus arrest or hold the horse, and a tripping mechanism upon the vehicle, whereby the speed of the vehicle operates to throw the obstructer into operation, substantially as described.

7. The combination, with the vehicle, of the obstructer A, supported thereon, and mechanism operated from the vehicle for bringing and holding the obstructer against the leg or legs of the horse with a gradually-increasing pressure, so as to obstruct its or their movement, and thus arrest or hold the horse, and a tripping mechanism upon the vehicle, whereby the speed of the vehicle operates to throw the obstructer into operation, substantially as described.

8. The combination, with the vehicle, of the obstructer A, mounted upon the shaft $a$, and arranged to be turned outward away from the horse and inward against the horse's leg or legs, and connections, as the strap or cord 26, by which the obstructer can be thrown into operation from the vehicle, substantially as described.

9. The combination, with the vehicle, of the obstructer A, mounted upon the shaft $a$, and arranged to be turned outward away from the horse and inward against the horse's leg or legs, connections, as the strap or cord 26, by which the obstructer can be thrown into operation from the vehicle, and the tripping mechanism connected with said strap or cord, by which the speed of the vehicle operates to throw the obstructer into operation, substantially as described.

10. The combination, with the vehicle, of the obstructer A, mounted upon the shaft $a$, and arranged to be turned outward away from the horse and inward against the horse's leg or legs, connections by which the obstructer can be thrown into operation from the vehicle, and means for gradually increasing the resistance offered by the obstructer, substantially as described.

11. The combination, with the obstructer A, of the spring 30 and the pawl-and-ratchet mechanism, by which the obstructer is made to offer a gradually-increasing resistance to the horse's leg or legs, substantially as described.

12. The combination, with the obstructer A, mounted upon the shaft $a$, of the spring 25, substantially as described.

13. The combination, with the obstructer A, mounted upon the shaft $a$, of the spring 25 and the strap or cord 26, extending to the vehicle, substantially as described.

14. The combination, with the obstructer A, mounted upon the shaft $a$, of the pawl 15 and stop or ratchet 6, substantially as described.

15. The combination, with the obstructer A, mounted upon the shaft $a$, of the spring 25, pawls 12 15, ratchet-bar 29, and spring 30, substantially as described.

16. The combination, with the obstructer A, mounted upon the shaft $a$, of the pawl 15, stop 6, and cam 16, substantially as described.

17. The combination, with the obstructer A, mounted upon the shaft $a$, of the strap or cord 26, extending to the vehicle, the pawls 12 15, ratchet-bar 29, and spring 30, substantially as described.

18. The combination, with the obstructer A, mounted upon the shaft $a$, of the spring 25, strap or cord 26, connected to a tripping mechanism on the vehicle, the pawls 12 15, ratchet-bar 29, and spring 30, substantially as described.

19. The combination, with the obstructer A, mounted upon the shaft $a$, of the pawls 12 15, ratchet-bar 29, spring 30, and the cams 16 17, substantially as described.

20. The combination, with the obstructer A, mounted upon the shaft $a$, of the pawls 12 15, ratchet-bar 29, spring 30, cams 16 17, operating-rod 57, and connections, substantially as described.

21. The combination, with the obstructer A, mounted upon the shaft a, of the pawls 12 15, ratchet-bar 29, spring 30, cams 16 17, operating-rod 54, and connections, substantially as described.

22. The combination, with the obstructer A, mounted upon the shaft a, of the pawls 12 15, ratchet-bar 29, spring 30, cams 16 17, operating-rods 57 and 54, and connections, substantially as described.

In testimony whereof I have hereunto set my hand in the presence of two subscribing witnesses.

WILLIAM WOODWARD ROSENFIELD.

Witnesses:
 JAMES A. HOVEY,
 T. H. PALMER.